US009643672B2

(12) United States Patent
Kettler (10) Patent No.: US 9,643,672 B2
(45) Date of Patent: May 9, 2017

(54) CHILD'S RIDE-ON TOY WITH REMOVABLE CART

(71) Applicant: KETTLER International, Inc., Virginia Beach, VA (US)

(72) Inventor: Joachim Kettler, Ense (DE)

(73) Assignee: KETTLER INTERNATIONAL, INC., Virginia Beach, VA (US)

( * ) Notice: Subject to any disclaimer, the term of this patent is extended or adjusted under 35 U.S.C. 154(b) by 0 days.

(21) Appl. No.: 14/313,281

(22) Filed: Jun. 24, 2014

(65) Prior Publication Data

US 2016/0280297 A1    Sep. 29, 2016

(51) Int. Cl.
| *B62K 9/02* | (2006.01) |
|---|---|
| *B62H 7/00* | (2006.01) |
| *B62J 9/00* | (2006.01) |
| *B62M 1/38* | (2013.01) |

(52) U.S. Cl.
CPC .................. *B62H 7/00* (2013.01); *B62J 9/00* (2013.01); *B62K 9/02* (2013.01); *B62M 1/38* (2013.01)

(58) Field of Classification Search
CPC .............. B62K 27/0003; B62K 27/006; B62K 2710/16; B62H 7/00
See application file for complete search history.

(56) References Cited

U.S. PATENT DOCUMENTS

| 2,475,177 | A | | 12/1946 | Chovan | |
|---|---|---|---|---|---|
| 2,459,249 | A | | 8/1947 | Sternad | |
| 3,724,873 | A | * | 4/1973 | Glamb | B62K 9/02 280/203 |
| 4,037,853 | A | * | 7/1977 | Sparks | B62B 1/208 280/204 |
| 4,695,071 | A | * | 9/1987 | Johnston | A61G 5/023 280/204 |
| 5,558,348 | A | | 9/1996 | Becka | |
| 5,927,730 | A | * | 7/1999 | Sattler | B62B 5/002 280/47.131 |
| 6,056,306 | A | * | 5/2000 | Rust | B62B 7/06 280/204 |
| 6,164,666 | A | | 12/2000 | Prea | |
| 6,601,862 | B2 | | 8/2003 | Kettler | |
| 6,685,207 | B1 | * | 2/2004 | Blake | B62K 9/02 280/278 |
| 6,799,772 | B2 | | 10/2004 | Kettler | |

(Continued)

FOREIGN PATENT DOCUMENTS

| DE | 29822874 U1 * | 5/2000 | ............... B62H 7/00 |
|---|---|---|---|
| DE | 102013114529 A1 * | 6/2015 | ............... B62H 7/00 |

(Continued)

*Primary Examiner* — Katy M Ebner
(74) *Attorney, Agent, or Firm* — Bernard G. Pike; Pike IP Law, PLLC (57) ABSTRACT

A child's ride-on toy comprising a push rod and a removable cart connected to the child's ride-on toy is described. The push rod of a child's ride-on toy typically extends upward and rearward from a connector at the rear of the frame of the child's ride-on toy to a handle at a height that may be easily manipulated by an adult. The push rod may be manipulated by an adult to control the speed and direction of the child's ride-toy or removed and connected to the cart for use of the cart independently of the ride-on toy.

14 Claims, 5 Drawing Sheets

(56) References Cited

U.S. PATENT DOCUMENTS

| | | | |
|---|---|---|---|
| 6,811,173 B1 * | 11/2004 | Shih | B62H 7/00 280/270 |
| 7,000,935 B2 * | 2/2006 | Gunter | B62K 9/02 280/272 |
| 7,044,491 B2 | 5/2006 | Kettler | |
| 7,387,310 B1 * | 6/2008 | Liu | B62B 7/10 280/47.38 |
| 7,625,002 B2 * | 12/2009 | Huang | B62K 21/00 280/272 |
| 7,967,317 B2 * | 6/2011 | Ewringmann | B62K 9/00 15/48.1 |
| 8,186,698 B2 * | 5/2012 | Gunderson | B62K 5/02 280/210 |
| 8,376,381 B2 * | 2/2013 | Shalaby | B62B 3/12 280/204 |
| 8,573,625 B2 * | 11/2013 | Gramme | B62K 5/025 280/204 |
| 8,678,412 B1 | 3/2014 | Oliveras et al. | |
| 8,678,424 B2 * | 3/2014 | Fleming | B62B 7/126 280/642 |
| 8,695,992 B2 * | 4/2014 | Piaget | B62B 5/0079 280/1.5 |
| 9,114,842 B2 * | 8/2015 | Bartels | B62H 7/00 |
| 2005/0035573 A1 | 2/2005 | Petrische | |
| 2009/0008164 A1 | 1/2009 | Shapiro | |
| 2011/0048311 A1 * | 3/2011 | Hosey | B62J 11/00 114/344 |
| 2011/0074125 A1 * | 3/2011 | Aiken | B62H 7/00 280/47.38 |
| 2014/0138932 A1 * | 5/2014 | Baron | B62K 13/08 280/279 |

FOREIGN PATENT DOCUMENTS

| | | | | |
|---|---|---|---|---|
| ES | 2253093 | | 8/2004 | |
| FR | 2713584 A1 * | | 6/1995 | B62K 5/02 |
| FR | EP 1048559 A1 * | | 11/2000 | B62H 7/00 |
| FR | 3018260 A1 * | | 9/2015 | B62H 7/00 |
| GB | 2309203 | | 7/1997 | |
| WO | WO2005105546 | | 11/2005 | |
| WO | WO2008135974 | | 11/2008 | |

* cited by examiner

CHILD'S RIDE-ON TOY WITH REMOVABLE CART

FIELD OF THE INVENTION

The present invention relates to a child's ride-on toy, such as a tricycle, scooter, or four wheeled ride-on toy, for example. Embodiments of the ride-on toy may comprise a removable cart with wheels. The cart may be removed from the ride-on toy and played with independently or separately from the ride-on toy. The cart is detachably or removably connectable to the frame of the ride-on toy and may be replaced on the ride-on toy.

BACKGROUND

Child's ride-on toys typically comprise wheels and may be rolled over a surface by pedaling or by pushing on the floor by the feet of the child. Some ride-on toys may also include a push rod that may be manipulated by a parent or a guardian. The parent may thus control the speed and direction of the ride-on toy if the child is too young or tired to move the ride-on toy themselves. In some cases, the push-rod may be removed from the ride-on toy so that the child may use the ride-on toy independently.

Parents may use the rid-on toy to take the child on a walk. In this case, the child can ride and control the ride-on toy themselves or a parent may push and control the ride-on toy from behind the ride-on toy.

In some embodiments, the ride-on toy may comprise a locking mechanism to prevent rotating the front wheel relative to the frame. With the front wheel locked in a fixed position, the adult pushing the ride-on toy may more easily control the direction of travel of the ride-on toy while the child enjoys the ride.

Further embodiments of ride-on toys comprise a rear bucket for storing toys or other objects. The bucket may be tipped while connected to the frame of the ride-on toy or removed and carried with the child.

There is a need for a ride-on toy with a removable rear bucket, cart, or other container comprising at least one wheel so the child may play with the bucket when not riding on the ride-on toy. There is a further need for a rear bucket or other container that comprises a push rod or a cart push rod connector to receive a push rod to help roll the bucket while not connected to the ride-on toy.

SUMMARY OF THE INVENTION

Child's ride-on toys come in many configurations including three wheeled tricycles and four wheeled scooters, for example. Embodiments are directed to a child's ride-on toy comprising a push rod and a removable cart connected to the child's ride-on toy. The push rod of a child's ride-on toy typically extends upward and rearward from a connector at the rear of the frame of the child's ride-on toy to a handle at a height that may be easily manipulated by an adult. The push rod may be manipulated by an adult to control the speed and direction of the child's ride-toy. In certain embodiments, the push rod may be extendable to allow a height adjustment to compensate for the various heights of adults that may push the child's ride-on toy. In some embodiments, the push rod may comprise two or more sections that may be connected and disconnected.

As such, embodiments of a child's ride-on toy may comprise a frame, wherein the frame comprises a frame push rod connector and a cart retaining portion for removably retaining a cart. The cart may also comprise a cart push rod connector. The push rod or a portion of the push rod may be reversibly connected in either the frame push rod connector or the cart push rod connector.

Other embodiments of a child's ride-on toy may comprise a frame, wherein the frame comprises the cart retaining portion for removably retaining a cart and the cart comprises a push rod that may be used to manipulate the child's ride-on toy when the cart is installed in the cart retaining portion and may be used to manipulate the cart when the cart is disconnected from the cart retaining portion. In this embodiment, the push rod does not need to be removed from the cart push rod connector to manipulate the ride-on toy by the push rod.

In a further embodiment, the ride-on toy comprises a front frame and a rear frame. A rear axle with at least one and, more typically, two rear wheels and a seat secured to the rear frame. The front frame may comprise a steering mechanism for rotating the front wheel. The steering mechanism typically comprises a fork tube which rotatably secures a fork. The fork is connected to a handlebar and rotatably supports at least one front wheel. Other steering mechanisms may be incorporated into other embodiments of the ride-on toy. In a typical ride-on toy, the front wheel may be equipped with pedal cranks or, alternatively, the pedal cranks may be drivingly coupled to rear wheels by a chain. The front frame and the rear frame may be adjustably or fixedly connected.

The cart may be capable of being removably received in and removed from the cart retaining portion of the frame such that a child may play with cart independently of the ride-on toy. The cart may comprise at least one wheel and a push rod or a cart push rod connector to allow manipulate the cart with a push rod. The push rod of the invention may comprise a handle portion and a push rod connector portion capable of removably connecting the push rod to either the complementary frame push rod connector or the complementary cart push rod connector. The child's ride-on toy may comprise a cart retaining portion comprising two fenders to cover the two rear wheels.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of components, parts, techniques and steps are disclosed. Each of these has individual benefit and each can also be used in conjunction with one or more, or in some cases, all of the other disclosed embodiments and techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

DESCRIPTION OF EMBODIMENTS

Children enjoy riding on ride-on toys whether they push with their feet or pedal the ride-on toy. Such ride-on toys may comprise two, three, four of more wheels. Since some children may be too young or too tired to safely control the ride-on toy independently, some ride-on toys may further comprise a push rod that allows an adult to control the ride-on toy for the child. In some embodiments, the push rod of a child's ride-on toy extends upward and rearward from a connector at the rear of the frame of the child's ride-on toy to a height that may be easily manipulated by an adult to control the speed and direction of the child's ride-toy. The push rod may further be extendable and/or retractable to allow a height adjustment to compensate for the various heights of adults that may wish to control the child's ride-on toy. In most cases, the push rod may be releasably or removably connected to the frame so that the push rod may be disconnected for the child to ride independently when in a safe location or when the child is capable of sufficiently controlling and maneuvering the ride-on toy safely. In some embodiments, the push rod may comprise two sections that may be connected and disconnected.

Embodiments of the child's ride-on toy comprise a push rod and a removable wheeled cart. As such, certain embodiments of a child's ride-on toy may further comprise a frame, wherein the frame comprises a frame push rod connector capable of removably connecting with the push rod and a cart retaining portion for removably retaining the wheeled cart on the ride-on toy. The cart may also comprise a cart push rod connector for removably connecting the cart to the push rod or a portion of the push rod.

Embodiments of the ride-on toy allow a child to transport a cart on the ride-on toy to a location where the child would like to play with the cart such as a beach, sand box, friend's house, park, or playground, for example. The cart may be removed from a cart retaining portion of the ride-on toy for use. Further, the push rod or a portion of the push rod may be removed from the ride-on toy and connected to the cart so the child may manipulate the cart independent of ride-on toy. Thus embodiments of a child's ride-on toy may comprise a push rod reversibly connected in either the frame push rod connector or at least a portion of the push rod may be reversibly connected to the cart push rod connector.

In other embodiments the child's ride-on toy may comprise a frame comprising a cart retaining portion for removably retaining a cart, wherein the cart comprises a push rod that may be used to manipulate the child's ride-on toy when the cart is installed in the cart retaining portion or may be used to manipulate the cart when the cart is disconnected from the cart retaining portion.

The ride-on toy may comprise a front frame and a rear frame. A rear axle with at least one and, more typically, two rear wheels and a seat may be secured to the rear frame. The front frame may comprise a steering mechanism for rotating the front wheel. The steering mechanism may comprise a fork tube which rotatably secures a fork. The fork is connected to a handlebar and rotatably supports at least one front wheel. In some embodiments of ride-on toys with push rods, the front wheel may be locked in a forward facing direction so that the front wheel may not be rotated. An adult will find it easier to manipulate and control the ride-on toy with the push rod if the front wheel is locked. A steering lock mechanism is described in U.S. Pat. No. 6,378,884 which is hereby incorporated by reference.

In a typical ride-on toy, the front wheel may be equipped with pedal cranks or, alternatively, the pedal cranks may be drivingly coupled to rear wheels by a chain. The ride-on toy may further comprise a free wheel setting wherein the pedals can be stationary as the front wheel rotates, for example, when an adult is pushing the ride-on toy with the push rod. A free wheeling mechanism is described in U.S. Pat. No. 6,705,443 which is hereby incorporated by reference.

The cart may be capable of being removably received in and removed from the cart retaining portion of the frame, wherein the cart comprises at least one wheel and a push rod or a cart push rod connector. The push rod of the invention may comprise a handle portion and a push rod connector portion capable of removably connecting the push rod to either the complementary frame push rod connector or the complementary cart push rod connector.

Figure 3A:
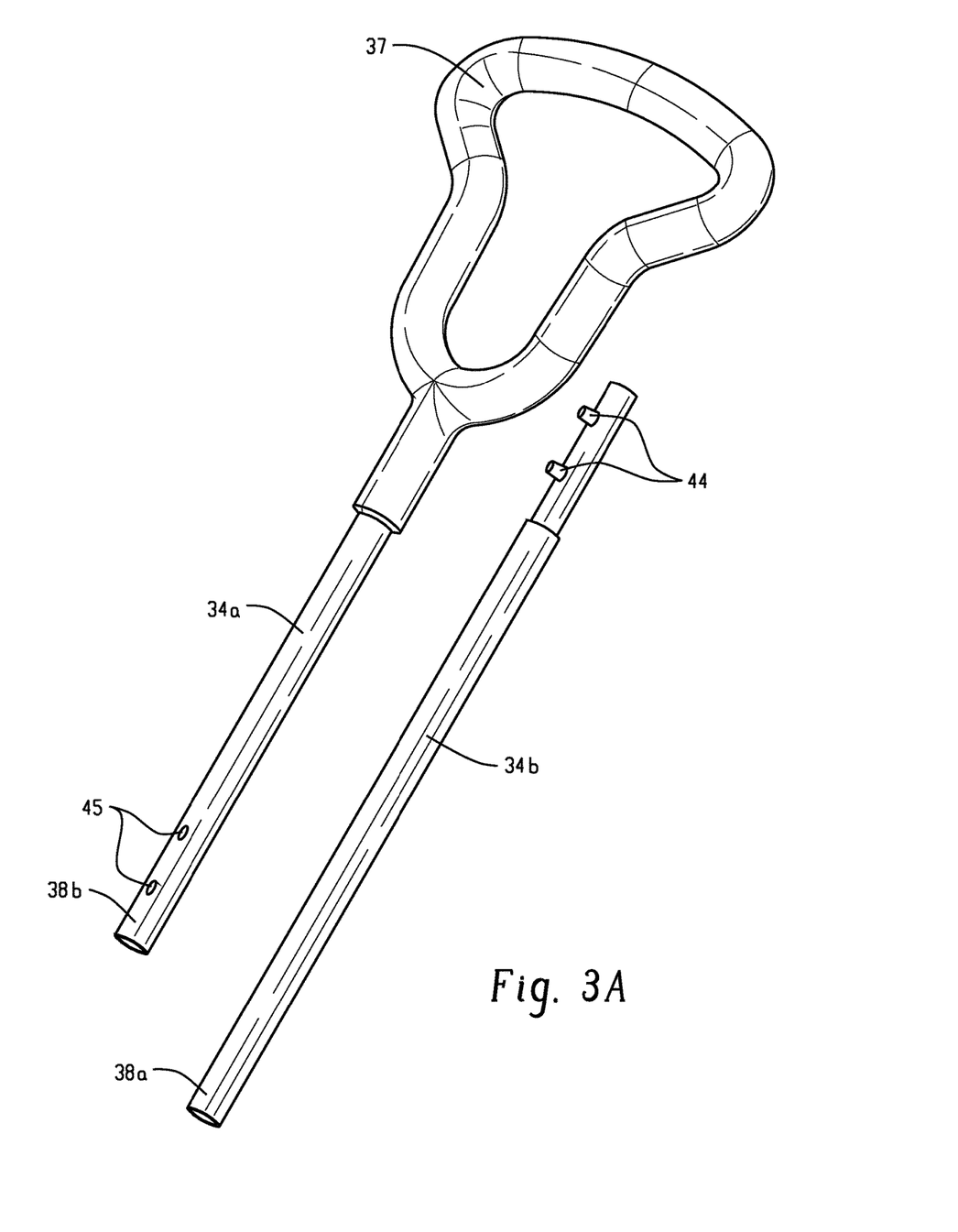
FIG. 3A depicts a two piece push rod comprising a connector for removably connecting the top section of the push rod to either a bottom portion of a push rod or a cart and FIG. 3B depicts a telescoping push rod that may be extended or retracted comprising a connector for connecting to a frame of a child's ride-on toy and a cart on the bottom of the push rod.

The push rod may have different designs for various embodiments of the child's ride-on toy. For example, the push rod may be one unitary rigid configuration comprising a handle portion permanently connected to the connector portion that may be received on the frame or cart. In another embodiment, the push rod may be several sections connected together, wherein at least one of the sections is reversibly connected such that the handle portion may be disconnected from the remaining portion of the push rod and reconnected as desired or the handle portion may be connected to the cart. In a further embodiment, the push rod may be extendable, for example, the push rod may comprise at least two telescoping sections that may be fixed at various lengths. See FIGS. 3A and 3B, for example.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
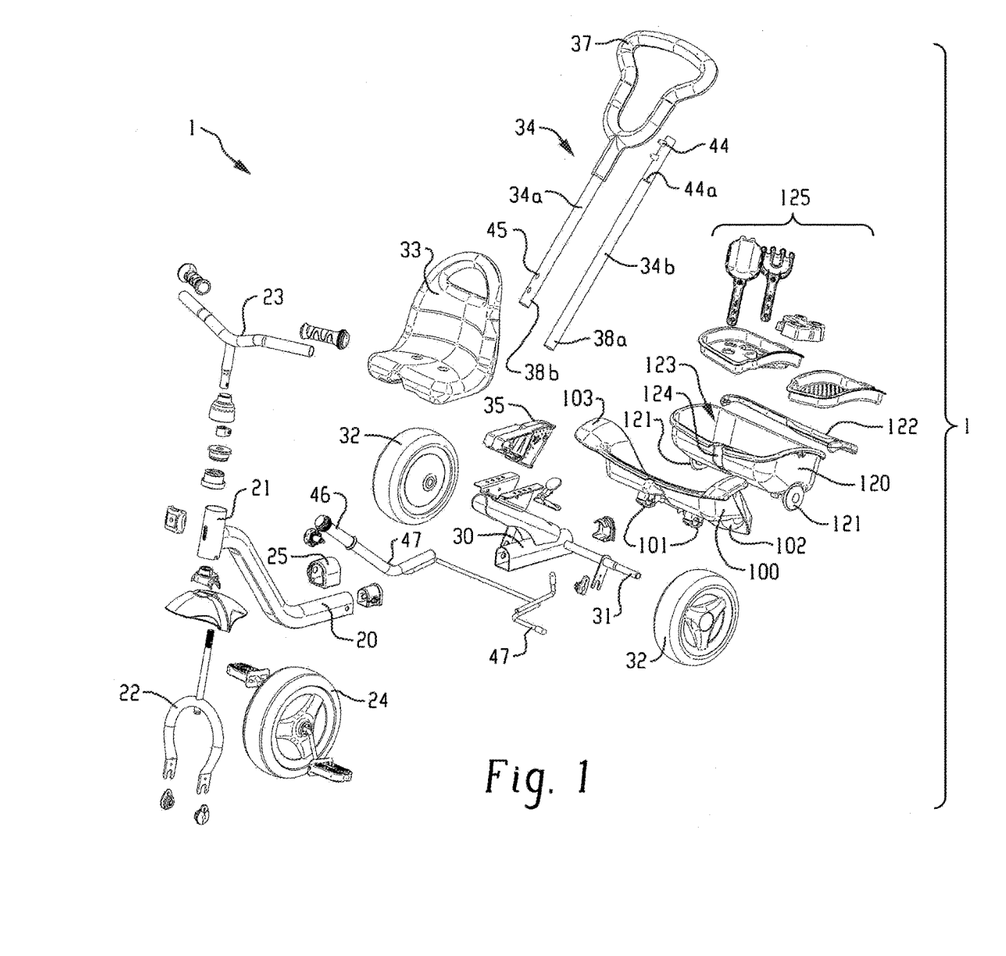
FIG. 1 depicts an embodiment of a child's ride-on toy comprising a frame push rod connector, a push rod capable of being connected to the frame push rod connector and a cart retaining portion for removably retaining the cart retaining a cart.

FIG. 1 shows an embodiment of a child's ride-on toy, a tricycle, which includes a rear frame 30 and a front frame 20. The rear frame 30 and the front frame 20 may be adjusted for various size riders. A rear axle 31 is rotatably connected to rear frame 30 and rotatably supports rear wheels 32. Rear frame 30 also supports a seat 33 for the rider. A push rod 34 may be connected to the frame push rod connector 35 with bottom connector 38a. For example, a two piece push rod 34. The two piece push rod comprises a top portion 34a and a bottom portion 34b for removably securing in the frame push rod connector 35. The top portion 34a comprises a handle 37 and an intermediate connector 38b. In this embodiment, the intermediate connector 38b may either connect to the top of the bottom portion 38b or to the cart push rod connector 124. See FIGS. 1 and 3A. The bottom portion 34b includes two spring biased manually operable protrusions 44 that may be received into apertures 45 defined in the cylindrical wall of top portion 34a to secure the two sections 34a 34b together. In the embodiment of the push rod 34 shown in FIG. 1, the bottom portion 34b comprises a rib 44a. The rib 44a prevents the top portion 34a from sliding any further down over the bottom portion 34b of the push rod 34.

Figure 3B:
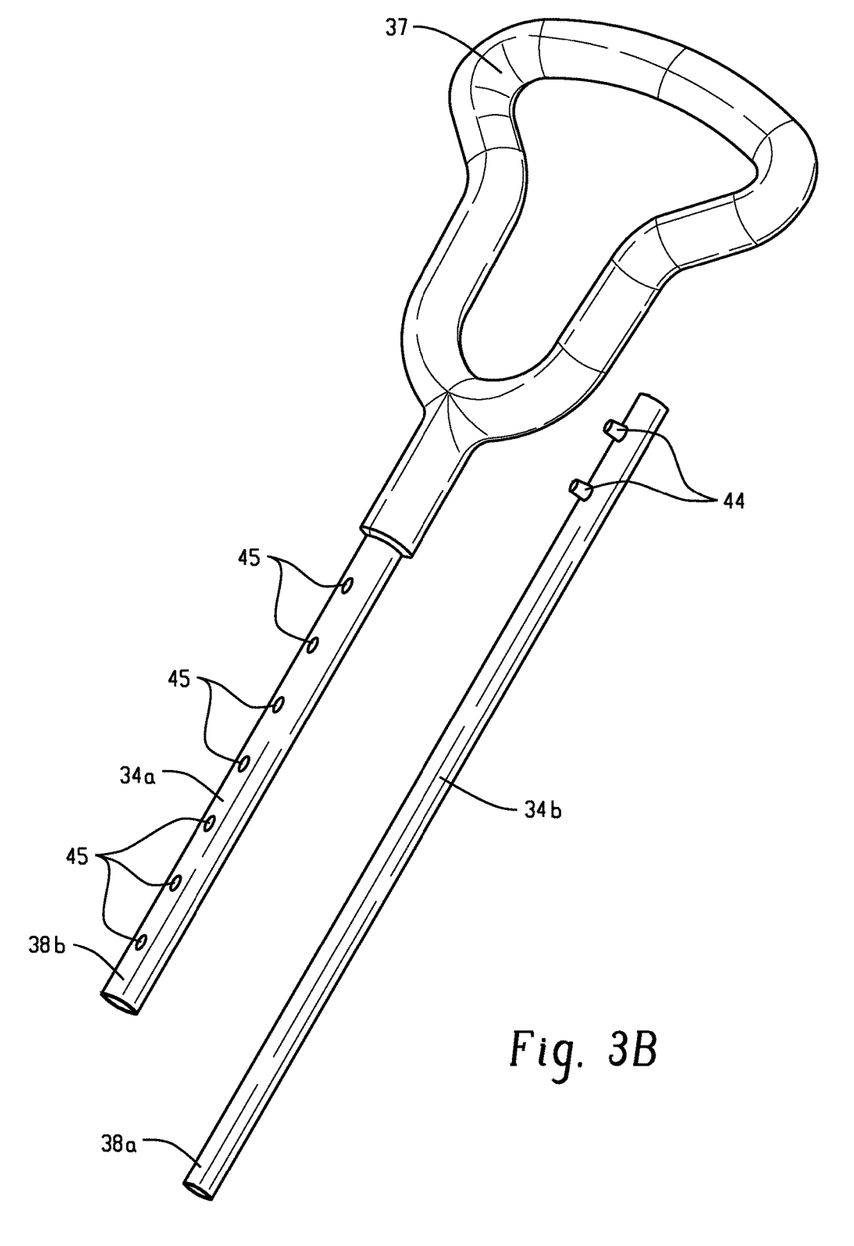

Other embodiments of a push rod 34 may be incorporated in embodiments of the child's ride-on toy. For example, FIG. 3B shows a telescoping push rod comprising a top portion with a plurality of apertures 45 and a bottom portion 34b which may slide more completely within the top portion 34a to adjust the length of the push rod. The push rod 34 may be one unitary piece or two or more pieces removably connected together. The connection may be the biased protrusion and apertures as described above, an interference fit, a friction fit, a threaded connection, a pin and aperture, or other releasable connection. In the embodiment of the push rod 34 shown in FIG. 1 and other similar sectional push rods, the push rod top portion 34a may comprise a connection portion 38b that may be connected to the cart push rod connector 124. In such embodiments, the push rod connector 124 may comprise protrusions that may be received within the apertures 45 to removably secure the top portion 34a to the cart 120. Further, FIG. 1 shows a brake grip 46 which is secured to a pivotable brake linkage 47 to press a brake levers 47 against rear wheels 32.

Front frame 20 includes a fork tube 21, and a fork 22, which is connected to a handlebar 23, can be rotatably supported in fork tube 21. A front wheel having cranks and pedals 24 is rotatably coupled to fork 21. The rear frame 30 comprises a first tubular profile and the front frame 20 comprises a second tubular profile. The two tubular profiles allow the frames to be telescoped one inside the other for adjustment of the overall length of the frame. In this embodiment, a clamping bush 25 with an adjustment screw secures the two frame members together for provide the tricycle frame.

The child's ride-on toy further comprises a frame push rod connector 35 for removably receiving the bottom portion 38a of the push rod 34b behind the seat 33 on the rear frame 30. The push rod 34 may be removed from the child's ride-on toy 1 to allow the child to ride independently or to reduce the size of the ride-on toy for storage or transport.

In further embodiments of the child's ride-on toy 1, the child's ride-on toy 1 comprises a cart retaining portion 100 for removably retaining a cart 120 on the child's ride-on toy 1. The walls of the cart 120 may define container 123 for retaining toys 125 or other articles. The cart retaining portion 100 may be attached to the rear portion of the frame by brackets 101 and screws or any other connecting means required to securely retain the cart retaining portion to the ride-on toy 1.

Embodiments of cart 120 comprise at least one wheel 121. The wheels are rotatably connected to the cart 120 such that the cart 120 may be pushed or pulled independently of the child's ride-on toy 1. The cart 120 may further comprise a handle 122 to carry the cart or to assist with removing and replacing the cart 120 in the cart retaining portion 100. The handle 122 may be rotatably connected to the cart 120 as known in the art.

The cart retaining portion 100 may comprise cart retaining features such as a cradle, protrusions, recesses, hooks, straps, apertures, ridges, lips, interference fits, screws, pins, or other means of removably retaining a cart with corresponding connection features in the cart 120. The cart retaining portion 100 shown in FIG. 1 comprises wheel recesses 102 to receiving the wheels 121 of cart 120 to retain the cart 120 in the cart retaining portion 100 during use of the child's ride-on toy 1. The cart retaining portion 100 may also comprise two fenders 103 to cover the two rear wheels 32 of the ride-on toy.

The cart 120 further comprises a cart push rod connector 124. The cart push rod connector 124 securely and removably connects at least a portion of the push rod 34 to the cart 120. In the embodiment of the ride-on toy and push rod 34 of FIG. 1, the top portion 34a of the push rod 34 may be disconnected from the bottom portion 34b and connected to the cart push rod connector 124 with connector 38b. This provides a shorter push rod 34a for the cart 120 to be manipulated by a child that is typically shorter than the adult that manipulates the complete ride-on toy 1. In this embodiment, the cart push rod connector 124 comprises a cylindrical recess for securely receiving the cylindrical bottom end connector 38b of the top portion 34a of the push rod 34. The cart push rod connector 124 may further comprise protrusions that are capable of being received within the apertures 45 to further secure the push rod 34 or a portion of the push rod 34a and/or 34b to the cart 120. The cart push rod connector and the push rod may comprise any connection means that allows the cart 120 to be manipulated by the push rod 34 or a portion of the push rod 34a and/or 34b such as, but not limited to, screwed fittings, interference fittings, pin and aperture, snap fittings, as well as other connections.

In other embodiments, the entire push rod 34 may be removed from the frame of the child's ride-on toy 1 and connected to the cart 120. In such embodiments, the bottom portion connector 38a selectively connects to either the cart push rod connector 120 or the frame push rod connector 35. In such an embodiment, a telescoping push rod 34 may desirable to allow the push rod 34 length to be adjusted for the height of the child using the cart 120.

In another embodiment, the child's ride-on toy comprises a cart retaining portion that securely attaches the cart to the ride-on toy such that the child's ride-on toy may be manipulated by the push rod with the push rod connected to the cart with the cart secured in the cart retaining portion. In such embodiments, the push rod may be removably or permanently connected to the cart and the cart is removably connected to the frame such that the ride-on toy may be safely manipulated by the adult and independently played with by the child.

Figure 2:
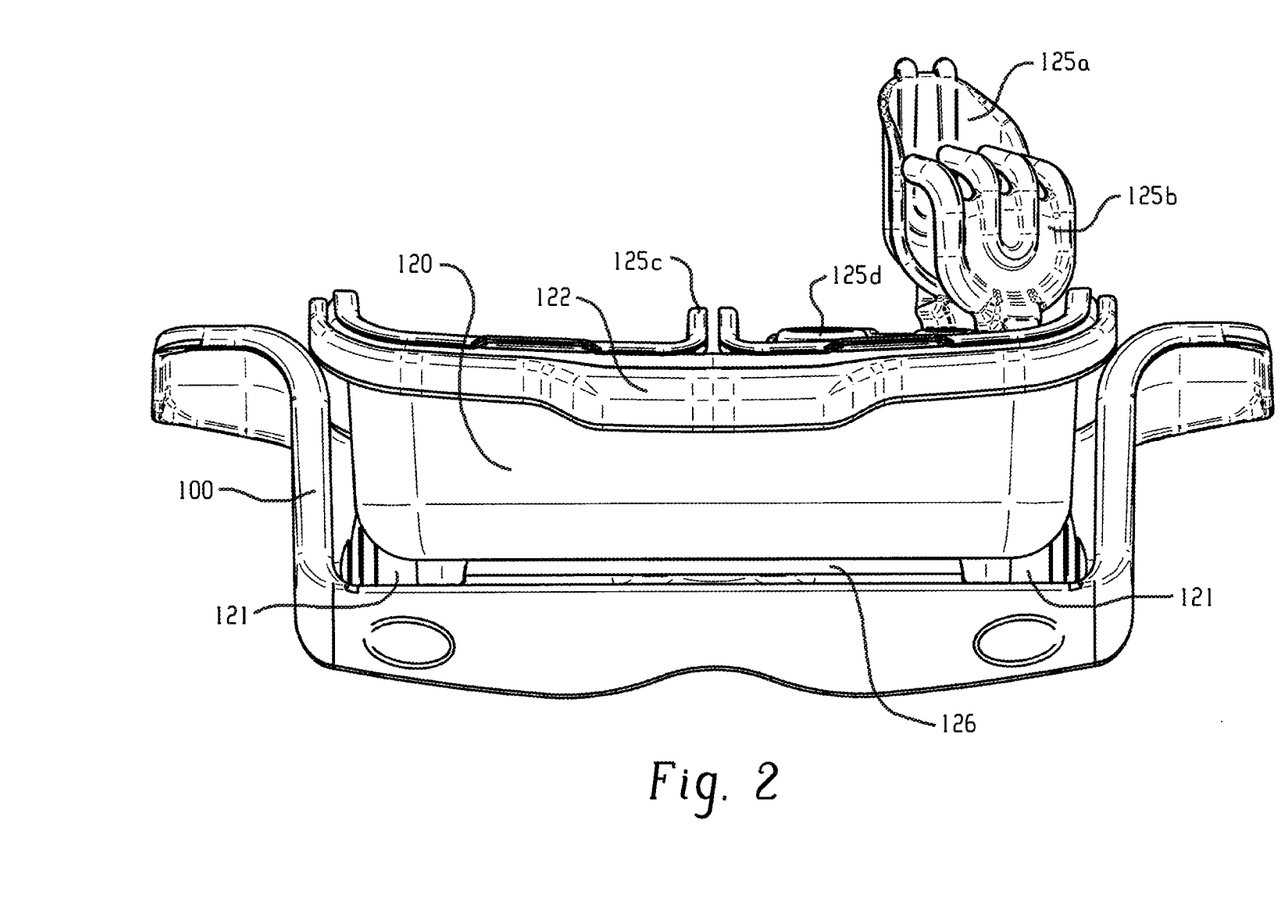
FIG. 2 depicts an embodiment of the cart in the cart retaining portion of the child; wherein the cart may be removed from the cart retaining portion of the frame and a push rod connected to the cart push rod connector.

FIG. 2 depicts a rear view of the cart 120 removably cradled in a cart retaining portion 100. The cart 120 comprises wheels 121. The wheels 121 are received within the wheel recesses 102 to securely cradle the cart 120 within the cart receiving portion 100. The rear portion of the cart receiving portion 120 is open allowing convenient removal of the cart 120 by lifting the handle 122 to raise the wheels 121 out of the wheel retaining recesses 102. In embodiments of the child's ride-on toy, a ground contacting surface of the wheels 121 on the cart 120 are held vertically higher than a ground contacting surface of rear wheels 32 when the cart 120 is received in the cart retaining portion 100. In the embodiment shown in FIG. 4, the toys 125 include a shovel 125a, a rake 125b, a sand sieve 125c and a sand mold 125d.

The wheels 121 of the cart are retained within recesses 102 of the cart retaining portion 120 such that a ground contacting surface of the wheels 121 on the cart 120 are held vertically higher than a ground contacting surface of rear wheels 32 when the cart 120 is received in the cart retaining portion 100.

Figure 4:
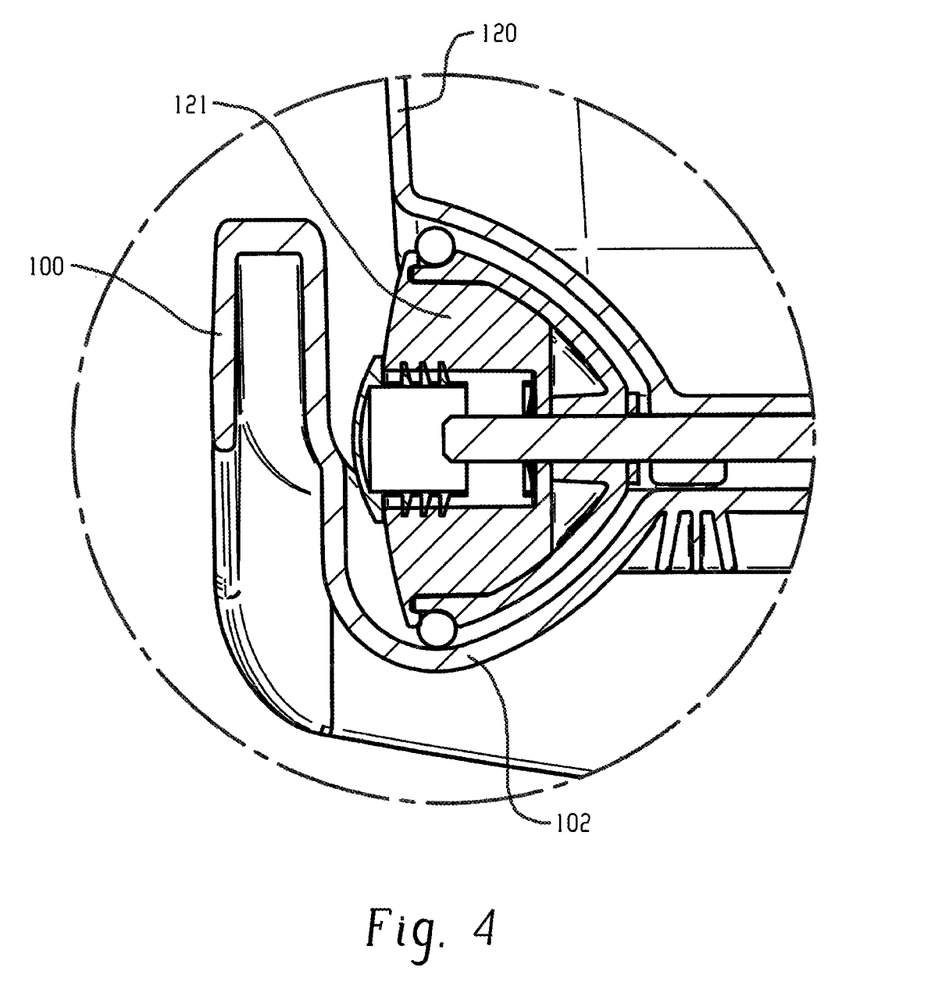
FIG. 4 depicts a cross-sectional view of the cart in a cart retaining portion of FIG. 2 showing a wheel of the cart within a recess in the cart retaining portion.

FIG. 4 depicts a cross-sectional view of the cart 120 in the cart retaining portion 100 wherein a wheel 121 of the cart 120 is received within the recess 102 defined by the walls of a bottom portion and side wall of the cart retaining portion 120.

The frame push rod connector and the cart push rod connector may comprise different designs capable of securely holding the components together such that the ride-on toy may be manipulated with the push rod and the cart may be independently manipulated with the push rod. For example, the push rod connector may be a post and the frame push rod connector and the cart push rod connector may define a recess for receiving the post within the recess or the opposite design wherein the frame push rod connector and the cart push rod connector are posts that may be received within a recess in either or both sections of a push rod. The frame push rod connector and the cart push rod connector may have similar rod receiving dimensions, for example, the post and the recess may have similar circular cross sections.

The embodiments of the described child's ride-on toy and method are not limited to the particular embodiments, components, method steps, and materials disclosed herein as such components, process steps, and materials may vary. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

The invention claimed is:

1. A child's ride-on toy, comprising:
   a frame, wherein the frame comprises a frame push rod connector and a cart retaining portion for removably retaining a cart;
   the cart capable of being removably received in the cart retaining portion of the frame, wherein the cart comprises at least one wheel and a cart push rod connector; and
   a push rod comprising a handle portion and a push rod connector capable of removably connecting the push rod to each of the frame push rod connector and the cart push rod connector wherein the cart retaining portion comprises a lip and the cart defines a recess for receiving the lip to maintain the cart within the cart retaining portion.

2. The child's ride-on toy of claim 1, comprising:
   two rear wheels rotatably connected to the frame by an axle.

3. The child's ride-on toy of claim 2, wherein the cart retaining portion comprises two fenders to cover the two rear wheels.

4. The child's ride-on toy of claim 1, a steering mechanism rotatably connected to the frame.

5. The child's ride-on toy of claim 4, comprising a front wheel connected to the steering mechanism for rotating the front wheel relative to the frame.

6. The child's ride-on toy of claim 5, a locking mechanism to prevent rotating the front wheel relative to the frame.

7. The child's ride-on toy of claim 5, wherein the steering mechanism comprises at least one stop to limit an angular rotation that the front wheel is capable of rotating.

8. The child's ride-on toy of claim 1, comprising pedals rotatably connected to the frame.

9. The child's ride-on toy of claim 1, comprising two rear wheels rotatably connected to the frame.

10. The child's ride-on toy of claim 1, wherein the cart comprises a container defined by a bottom and side walls of the cart.

11. The child's ride-on toy of claim 1, wherein the frame push rod connector and the cart push rod connector comprise similar rod receiving dimensions.

12. The child's ride-on toy of claim 1, wherein the push rod connector is a post and the frame push rod connector and the cart push rod connector define a recess for receiving the post within the recess.

13. The child's ride-on toy of claim 12, wherein the post and the recess have a circular cross section.

14. A child's ride-on toy, comprising:
   a frame, wherein the frame comprises a frame push rod connector and a cart retaining portion for removably retaining the cart;
   a cart capable of being removably received in the cart retaining portion of the frame, wherein the cart comprises at least one wheel and a cart push rod connector;
   two rear wheels rotatably connected to the frame by an axle; and
   a push rod comprising a handle portion and a push rod connector capable of removably connecting the push rod to either the frame push rod connector and the cart push rod connector, wherein a ground contacting surface of the wheels on the cart are held vertically higher than a ground contacting surface of rear wheels when the cart is received in the cart retaining portion.

* * * * *